US011932361B2

(12) United States Patent
Handle

(10) Patent No.: US 11,932,361 B2
(45) Date of Patent: Mar. 19, 2024

(54) HYDRAULIC SYSTEM FOR STABILIZER DRIVE

(71) Applicant: Moog GmbH, Boblingen (DE)

(72) Inventor: Werner Handle, Siegelhausen (DE)

(73) Assignee: Moog GmbH, Boblingen (DE)

(*) Notice: Subject to any disclaimer, the term of this patent is extended or adjusted under 35 U.S.C. 154(b) by 407 days.

(21) Appl. No.: 17/598,577

(22) PCT Filed: Mar. 18, 2020

(86) PCT No.: PCT/EP2020/057491
§ 371 (c)(1),
(2) Date: Sep. 27, 2021

(87) PCT Pub. No.: WO2020/200794
PCT Pub. Date: Oct. 8, 2020

(65) Prior Publication Data
US 2022/0177084 A1 Jun. 9, 2022

(30) Foreign Application Priority Data
Apr. 1, 2019 (DE) ......................... 102019108476.8

(51) Int. Cl.
*B63B 39/06* (2006.01)
*F15B 11/16* (2006.01)

(52) U.S. Cl.
CPC .............. *B63B 39/06* (2013.01); *F15B 11/16* (2013.01); *F15B 2211/20515* (2013.01);
(Continued)

(58) Field of Classification Search
CPC ..................... B63B 39/06; F15B 11/16; F16B 2011/20515; F16B 2011/20561;
(Continued)

(56) References Cited

U.S. PATENT DOCUMENTS 3,643,617 A 2/1972 Holden
4,836,810 A * 6/1989 Entringer ............... B63H 20/12 440/61 R
4,919,064 A 4/1990 Ehluss et al.
2014/0151501 A1* 6/2014 Kondo .................... B64C 25/24 244/102 R

FOREIGN PATENT DOCUMENTS

DE 1195191 B 6/1965
DE 102007021287 A1 12/2007
(Continued)

OTHER PUBLICATIONS

European Patent Office (ISA/EP), International Search Report and Written Opinion in PCT/EP2020/057491, dated Jul. 20, 2020, 11 pages.
(Continued)

*Primary Examiner* — Stephen P Avila
(74) *Attorney, Agent, or Firm* — Harter Secrest & Emery LLP

(57) ABSTRACT

The hydraulic system according to the invention is a hydraulic system for controlling a stabilizer drive, in particular for controlling an angle of attack and/or a pivoting out and in of a stabilizer wing, preferably for ships. The hydraulic system according to the invention has a rotary vane motor that changes the angle of attack of the stabilizer wing and/or a hydraulic cylinder for pivoting the stabilizer wing out and in, along with a first hydraulic circuit. The first hydraulic circuit furthermore comprises a low-pressure circuit and a high-pressure circuit, a device for providing an admission pressure of the low-pressure circuit, and two anti-cavitation valves which separate the first low-pressure circuit from the first high-pressure circuit. The hydraulic system according to the invention is furthermore characterized in that a first hydraulic pump driven by an electric motor and having two connections is integrated in the high-pressure circuit.

25 Claims, 5 Drawing Sheets

Figure 1:
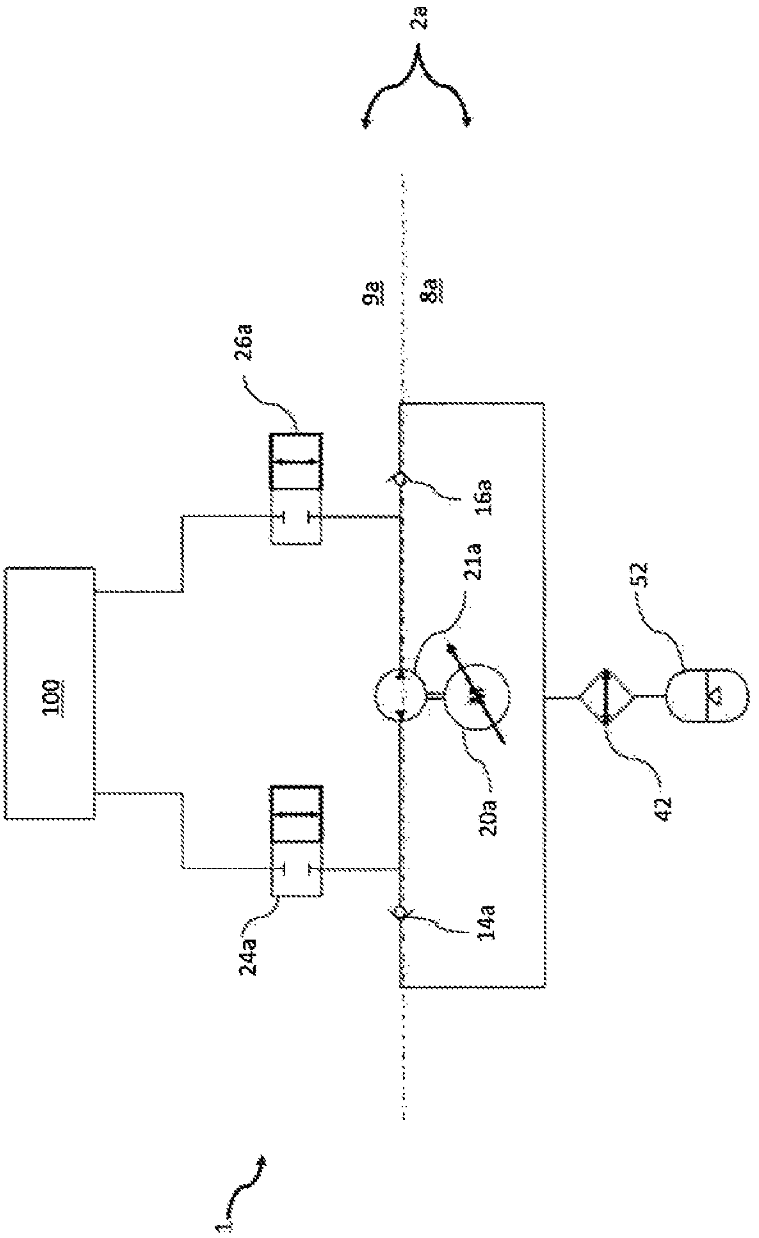

(52) U.S. Cl.
CPC ............... *F15B 2211/20561* (2013.01); *F15B 2211/20592* (2013.01); *F15B 2211/212* (2013.01); *F15B 2211/27* (2013.01); *F15B 2211/30505* (2013.01); *F15B 2211/30525* (2013.01); *F15B 2211/3138* (2013.01); *F15B 2211/31541* (2013.01); *F15B 2211/6651* (2013.01); *F15B 2211/71* (2013.01); *F15B 2211/78* (2013.01); *F15B 2211/8757* (2013.01)

(58) Field of Classification Search
CPC ...... F16B 2011/20592; F16B 2011/212; F16B 2011/27; F16B 2011/30505; F16B 2011/30525; F16B 2011/3138; F16B 2011/31541; F16B 2011/6651; F16B 2011/71; F16B 2011/78; F16B 2011/8757
See application file for complete search history.

(56) References Cited

FOREIGN PATENT DOCUMENTS

| | | | | |
|---|---|---|---|---|
| DE | 102017106693 B3 * | 5/2018 | .............. F15B 1/022 |
| DE | 102017121471 A1 | 3/2019 | |
| JP | S58133999 A | 8/1983 | |
| JP | 2014061842 A | 4/2014 | |
| WO | 2011100797 A1 | 8/2011 | |

OTHER PUBLICATIONS

European Patent Office (ISA/EP), International Preliminary Report on Patentability in PCT/EP2020/057491, dated Jan. 15, 2021, 19 pages.

* cited by examiner

HYDRAULIC SYSTEM FOR STABILIZER DRIVE

The present invention relates to a hydraulic system for a stabilizer drive, and in particular to a hydraulic system for controlling an angle of attack and/or for pivoting a stabilizer wing out and in, preferably in ships.

The term "ship stabilizers" refers to various systems that can be used to prevent or at least reduce the rolling of a ship (i.e., the rotational movement about the longitudinal axis) during wind and sea motion.

Especially on passenger ships, stabilizers are used to make travel more comfortable for the passenger and to avoid the occurrence of sea sickness in passengers. Stabilizers are, however, also used on ferries and container ships in which greater damage could occur as a result of the load slipping.

One type of stabilizers that are common in the prior art is referred to as bilge keel, and are primarily steel profiles that are welded to a ship hull under the water line of the hull. Although this type of stabilizers is very cost-effective, they have the disadvantage that they have a generally low degree of effectiveness and, since they are welded, they exert a permanent braking effect on the hull of the ship.

However, since stabilization of the ship is not always necessary, fin stabilizers are used in the prior art and in particular in the case of large ships. This system uses movable fins on the ship hull in order to erect the ship by the pressure of the applied water flow. The fins can be pivoted in and out of the ship hull, and the angle of attack can be adjusted hydraulically as a function of the rolling movement of the ship.

In the case of the stabilizer drives of the prior art, the pivoting in and out along with the adjustment of the angle of attack take place by means of constant pressure hydraulics, whereby high energy consumption and, due to the use of control pumps operating constantly against the system pressure, high noise generation are produced.

In the case of constant pressure systems, the complete hydraulic part between the control valve and pumps is also under high pressure and pulsation as a consequence of the pump pulsation. This leads to further noise emissions and to a non-negligible risk potential due to the constant pressure exerted on the lines.

Based on this prior art, it is an object of the present invention to at least partially overcome or improve the disadvantages of the prior art.

The object is achieved with a device according to claim 1. Preferred embodiments and modifications are the subject matter of the subclaims. A method for operating the hydraulic system is defined in claim 19.

[1] The hydraulic system according to the invention is a hydraulic system for controlling a stabilizer drive, in particular for controlling an angle of attack and/or a pivoting out and in of a stabilizer wing, preferably for ships.

The hydraulic system according to the invention has a rotary vane motor that changes the angle of attack of the stabilizer wing and/or a hydraulic cylinder for pivoting the stabilizer wing out and in, along with a first hydraulic circuit.

The first hydraulic circuit furthermore has a low-pressure circuit and a high-pressure circuit, a device for providing an admission pressure of the low-pressure circuit and two anti-cavitation valves that separate the first low-pressure circuit from the first high-pressure circuit.

The hydraulic system according to the invention is furthermore characterized in that a first hydraulic pump driven by an electric motor and having two connections is integrated in the high-pressure circuit and is hydraulically connected to the rotary vane motor and/or the hydraulic cylinder.

Stabilizer wings that can both be pivoted in and out of the ship hull and can be angularly adjusted, in particular for counteracting a rolling movement of a ship, are used for stabilizing a ship.

The embodiment according to the invention of the hydraulic system accordingly has a rotary vane motor by means of which the angle of attack of the stabilizer wing can be changed and/or a hydraulic cylinder for pivoting the stabilizer wing out and in. In accordance with an embodiment [10] according to the invention, the rotary vane motor can be a further hydraulic cylinder or a cylinder arrangement.

The rotary vane motor and/or the hydraulic cylinder are arranged in the high-pressure circuit of the hydraulic system and are operated by the first hydraulic pump, which is driven by a first electric motor.

[2] In accordance with one embodiment according to the invention, the electric motor is a variable-speed electric motor and the first hydraulic pump is a simple hydraulic pump or a constant-speed electric motor and then the first hydraulic pump is a variable-volume hydraulic pump.

The first hydraulic pump can accordingly be variable in volume or speed and can preferably provide two possible flow directions of the hydraulic fluid in the hydraulic circuit during operation. The selection of the hydraulic pumps is in this case determined by factors, such as system costs, reliability, permitted noise emission or efficiency.

The first hydraulic pump furthermore has two connections, which in accordance with a further embodiment according to the invention are hydraulically connected to the rotary vane motor and/or the hydraulic cylinder via 2/2-way valves, preferably unlockable 2/2-way valves.

The term "unlockable" is to be understood to mean that the valve has a locking position that can be opened or locked electrically or by means of a separate pressure circuit. In fact, in accordance with a further embodiment according to the invention, the 2/2-way valves are electrically controlled 2/2-way valves.

The low-pressure circuit serves both to pressurize the hydraulic system and to depressurize the hydraulic fluid coming from the high-pressure circuit. The high-pressure and low-pressure circuits are separated from one another by two anti-cavitation valves. However, a plurality of valves may also be arranged according to the invention. The anti-cavitation valves can be check valves or controlled check valves, for example.

The pressurization of the low-pressure region takes place by means of a device for providing an admission pressure.

[3] In accordance with an embodiment according to the invention, the device for providing an admission pressure is a pressure accumulator, in particular a pressure accumulator having a variable volume.

The variable volume can moreover be realized with further, different devices. For example, any geometric shapes with elastic walls may be used.

If only one pressure accumulator or one pressure accumulator having a variable volume is used to generate an admission pressure, it is advantageous that the pressurization already takes place in the pressure accumulator and no additional pump unit is necessary for generating an admission pressure. This saves costs and maintenance work.

[4] Alternatively and in accordance with a further embodiment according to the invention, the device for providing an admission pressure can be a second hydraulic pump that is connected to a hydraulic fluid reservoir, in particular to an open tank, and driven by a second electric motor.

If the hydraulic fluid reservoir is an open tank, the hydraulic system has the advantage that the hydraulic fluid can be transported with sufficient size without the need for cooling in the tank. Furthermore, hydraulic fluid is removed from the hydraulic fluid reservoir and fed into the hydraulic system only via the second hydraulic pump. Thus, less oil is continuously circulated, as a result of which the hydraulic fluid reservoir can again be made smaller.

In accordance with a further embodiment according to the invention, in the embodiment with a second hydraulic pump and the hydraulic fluid reservoir, the hydraulic fluid reservoir can be a pressure accumulator or a pressure accumulator having a variable volume. In this case, the second hydraulic pump would essentially serve to control the hydraulic flow, since the pressure accumulator provides at least in part the required admission pressure. Thus, less powerful hydraulic pumps would be necessary, which is again cost-saving.

[5] In accordance with a further embodiment according to the invention, both connections of the first hydraulic pump are each fluidically connected to a first line, wherein the first line is fluidically connected to the rotary vane motor and the hydraulic cylinder. Accordingly, in accordance with this embodiment according to the invention, the first hydraulic pump can be connected hydraulically in a first way to the rotary vane motor and/or the and can additionally be connected hydraulically in a second way with the first line to both the rotary vane motor and the hydraulic cylinder.

Accordingly, in this embodiment, the hydraulic system has both a hydraulic cylinder and a rotary vane motor.

[6] In accordance with a further embodiment according to the invention, a check valve, and in particular a controlled check valve, is arranged between the first line and the respective connections of the first hydraulic pump. Both connections of the first hydraulic pump can thus be fluidically connected to the first line via a check valve in each case.

[7] In particular, the first hydraulic pump in accordance with a further embodiment according to the invention can be hydraulically connected to the first line via a first and a second 4/3-way valve, preferably having a locking center position, to the rotary vane motor and the hydraulic cylinder in each case.

In accordance with this embodiment of the hydraulic system according to the invention, the two connections of the first hydraulic pump are thus each fluidically connected to the additional first line. The connections of the first hydraulic pump are thus fluidically connected with the first line and via the 4/3-way valves to the rotary vane motor and to the hydraulic cylinder. This means in particular that the two connections of the first hydraulic pump are connected to the rotary vane motor or the hydraulic cylinder and additionally fluidically connected via the 4/3-way valves to the rotary vane motor and to the hydraulic cylinder.

The 4/3-way valves preferably have a locking center position, wherein [9] in accordance with a further embodiment according to the invention, the first and/or the second 4/3-way valve is an electrically controlled 4/3-way valve.

[8] Furthermore, in a further embodiment of the hydraulic system according to the invention, the rotary vane motor and the hydraulic cylinder can each be hydraulically connected via the first or the second 4/3-way valve with a depressurization line to the low-pressure circuit of the first hydraulic circuit.

The rotary vane motor and the hydraulic cylinder are accordingly furthermore hydraulically connected via the first and the second 4/3-way valve to a depressurization line, which in turn is hydraulically connected to the low-pressure circuit. As the name indicates, the depressurization line serves to depressurize, i.e., to decrease the pressure of, the hydraulic fluid coming from the rotary vane motor and/or from the hydraulic cylinder. The hydraulic fluid flows via the depressurization line into the low-pressure circuit and is reused in the low-pressure circuit.

[11] In accordance with a further embodiment according to the invention, a flow cooler for cooling the hydraulic fluid is arranged in the first low-pressure circuit. The hydraulic fluid flowing through the low-pressure circuit can thus be additionally cooled. Of course, filters and further devices, such as vents, can also be integrated on the outlet line.

[12] In accordance with yet a further embodiment according to the invention, the hydraulic cylinder is a hydraulic cylinder having a first and a second chamber. The hydraulic cylinder can be, for example, a differential cylinder or a synchronous cylinder.

[13] If the hydraulic cylinder has two chambers, the 4/3-way valve, which is arranged between the first line and the hydraulic cylinder, is hydraulically connected with a first connecting line to the first chamber of the hydraulic cylinder and with a second connecting line to the second chamber of the hydraulic cylinder.

[14] Furthermore, a further embodiment according to the invention includes a check valve for the leak-free blocking of the hydraulic cylinder being arranged in each case in the first and in the second connecting line.

The stabilization of a ship on the high sea by means of the hydraulic system according to the invention is important for safety reasons and for the well-being of the passengers on board. The correct angle of attack of the stabilizer wing is essential in this respect in order to make counteracting the rolling movement of the ship possible. At the same time, the early pivoting in of the stabilizer wing must always be ensured when the ship enters the harbor.

A problem or a malfunction in the hydraulic system according to the invention could therefore have serious consequences both for the ship and in particular for the crew and passengers on board.

[15] In order to minimize this risk, the hydraulic system according to the invention has a second hydraulic circuit in accordance with a further embodiment according to the invention. This second hydraulic circuit in turn has the following: a second low-pressure circuit and a second high-pressure circuit; a second device for providing an admission pressure in the second low-pressure circuit; a third hydraulic pump driven by a third electric motor and having two connections, wherein the third hydraulic pump is arranged in the second high-pressure circuit and is hydraulically connected to the rotary vane motor and/or the hydraulic cylinder; and two second anti-cavitation valves that separate the second low-pressure circuit from the second high-pressure circuit. Furthermore, the second hydraulic circuit is fluidically connected to the first hydraulic circuit.

The second hydraulic circuit essentially has all the properties of the first hydraulic circuit and is in particular fluidically connected thereto. [16] In particular, in accordance with a further embodiment according to the invention, the first low-pressure circuit and the second low-pressure circuit are fluidically connected to one another.

The second hydraulic circuit can be referred to as a redundant circuit. If a fault arises in the first circuit, or if the latter is damaged, the second hydraulic circuit can control the rotary vane motor and/or the hydraulic cylinder, thus preventing serious consequences for the ship and the crew.

[17] As already for the first hydraulic circuit, the third electric motor of the second hydraulic circuit can be a variable-speed electric motor and the third hydraulic pump can be a simple hydraulic pump, or the third electric motor is a constant-speed electric motor and the third hydraulic pump is a variable-volume hydraulic pump.

[18] Similarly to the first hydraulic circuit, the second device for providing an admission pressure can be a pressure accumulator, in particular a pressure accumulator having a variable volume. [19] Alternatively, the second device for providing an admission pressure can be a fourth hydraulic pump that is connected to a hydraulic fluid reservoir, in particular to an open tank, and driven by a fourth electric motor.

Combinations in which the hydraulic fluid reservoir is a pressure accumulator and in particular a pressure accumulator having a variable volume and the fourth hydraulic pump is arranged in the low-pressure circuit, as described with reference to the second hydraulic pump in the first hydraulic circuit, are also within the meaning of the present invention.

[20] In accordance with a further embodiment according to the invention, both connections of the third hydraulic pump are each fluidically connected via a check valve to the first line. In accordance with this embodiment, similarly to the first hydraulic pump, the third hydraulic pump would thus be hydraulically connected in a first way to the rotary vane motor and/or to the hydraulic cylinder and additionally hydraulically connected in a second way with the first line to both the rotary vane motor and the hydraulic cylinder.

In accordance with a further embodiment according to the invention, both connections of the third hydraulic pump can in particular be each fluidically connected via a check valve to the first line. The check valves can be controlled check valves, as described for the first hydraulic circuit.

[21] In order to cool the hydraulic fluid from the second hydraulic circuit, a second flow cooler can be arranged in the second low-pressure circuit in accordance with a further embodiment according to the invention.

Where appropriate, a single flow cooler can also be arranged on a connecting line that connects the first low-pressure circuit to the second low-pressure circuit.

[22] Furthermore, in a further embodiment according to the invention, the depressurization line can also be hydraulically connected to the second low-pressure circuit of the second hydraulic circuit. Wherein, in accordance with a further embodiment according to the invention, at least one check valve is arranged in the depressurization line.

Accordingly, hydraulic fluid flowing out of the rotary vane motor and/or out of the hydraulic cylinder is conducted by means of the depressurization line in the first and/or in the second low-pressure circuit, from where the hydraulic fluid is reused.

In accordance with a further embodiment according to the invention, the second and/or the fourth electric motor, that is to say the electric motors that, where appropriate, drive the second and fourth hydraulic pumps to form an admission pressure, can be variable-speed electric motors, such as servomotors. The energy consumption, the hydraulic power loss introduced into the oil and the noise emission thus decrease.

The invention also relates to a method for operating a hydraulic system in accordance with one of the preceding embodiments according to the invention. [26] The method according to the invention is characterized in that the control and/or regulation of the rotary vane motor and/or of the hydraulic cylinder takes place by means of the first and/or the second hydraulic circuit.

[24] In particular, the control and/or regulation of the rotary vane motor and/or of the hydraulic cylinder can take place by means of the first hydraulic circuit. [25] Furthermore, the control and/or regulation of the rotary vane motor and/or of the hydraulic cylinder can take place by means of the second hydraulic circuit.

[27] An embodiment of the method according to the invention furthermore provides that the hydraulic system is of redundant design when the first and the second hydraulic circuit are present. This means that one of the two hydraulic circuits can step in if the other one has problems. Where appropriate, the first and the second hydraulic circuit can also be operated in parallel.

In particular, in the embodiments that comprise a first and a second hydraulic fluid circuit and in which the stabilizer wing is in a pivoted-out state, the rotary vane motor and/or the hydraulic cylinder is controlled via the 2/2-way valves by means of the first hydraulic pump and/or via the 2/2-way valves by means of the second hydraulic pump.

This means, in particular, that the angle of attack of the stabilizer wing or the pivoting in and out of the stabilizer wing is controlled essentially via the 2/2-way valves. This is advantageous since a faster and more direct control of the rotary vane motor and/or of the hydraulic cylinder is provided.

If one embodiment of the hydraulic system has both the rotary vane motor and the hydraulic cylinder, they are fluidically connected via the 4/3-way valves and with the first line to the first and/or to the third hydraulic pump.

Thus, the pivoting in and out can be controlled by means of the first line via the 4/3-way valves and the hydraulic cylinder, and the angle of attack of the stabilizer wing can simultaneously be controlled with the first line via the further 4/3-way valve and the rotary vane motor. This takes place via the same line and can accordingly be controlled jointly via a single hydraulic pump (the first or third) but also via the first and third hydraulic pumps, which reduces costs and effort.

Of course, the use of the hydraulic system according to the invention in one of its various embodiments is not limited to the use in ships but can be used for any devices and technical fields in which such a hydraulic system is advantageous.

The invention is explained below with reference to various exemplary embodiments, wherein it is pointed out that these examples encompass modifications or additions as they immediately arise for the person skilled in the art.

Figure 2:
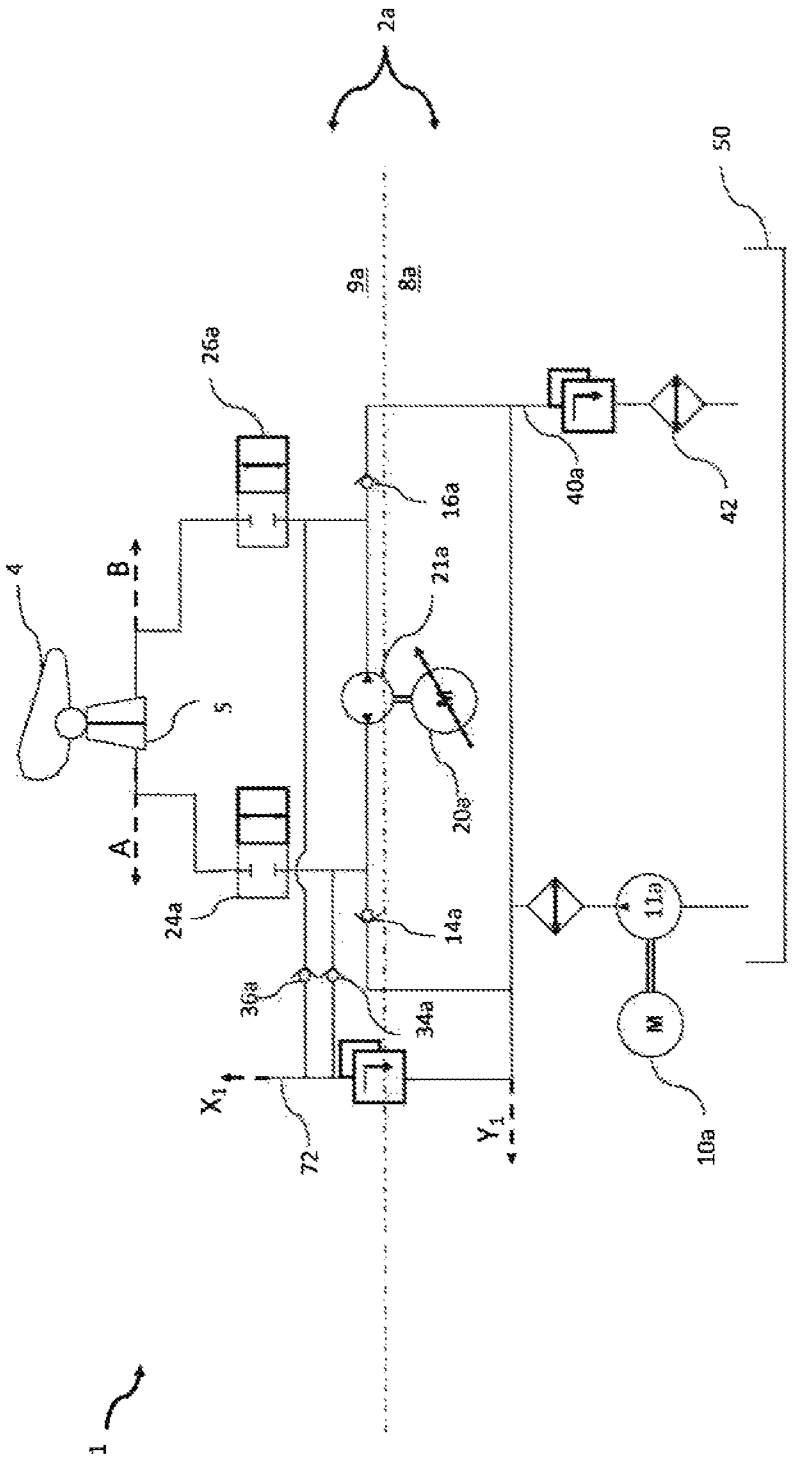
Figure 3:
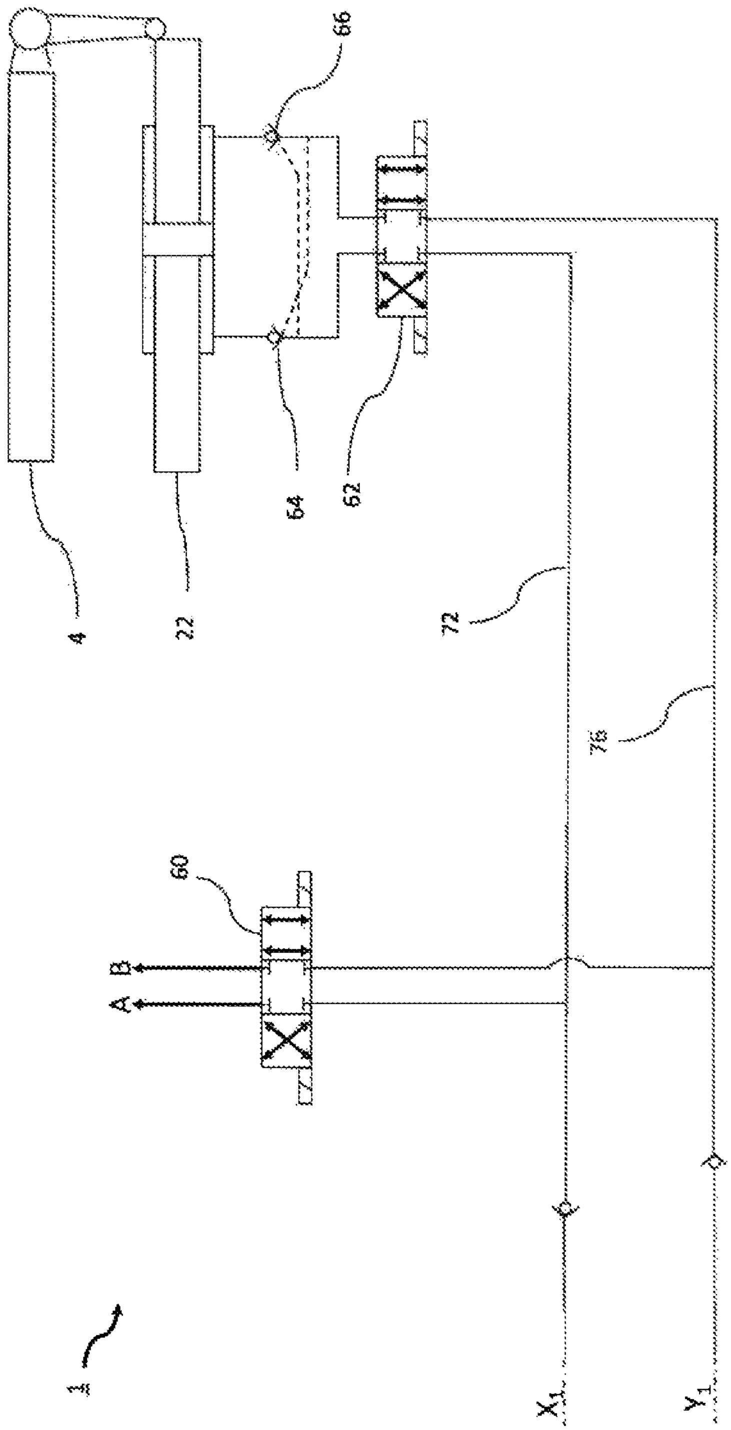
Figure 4:
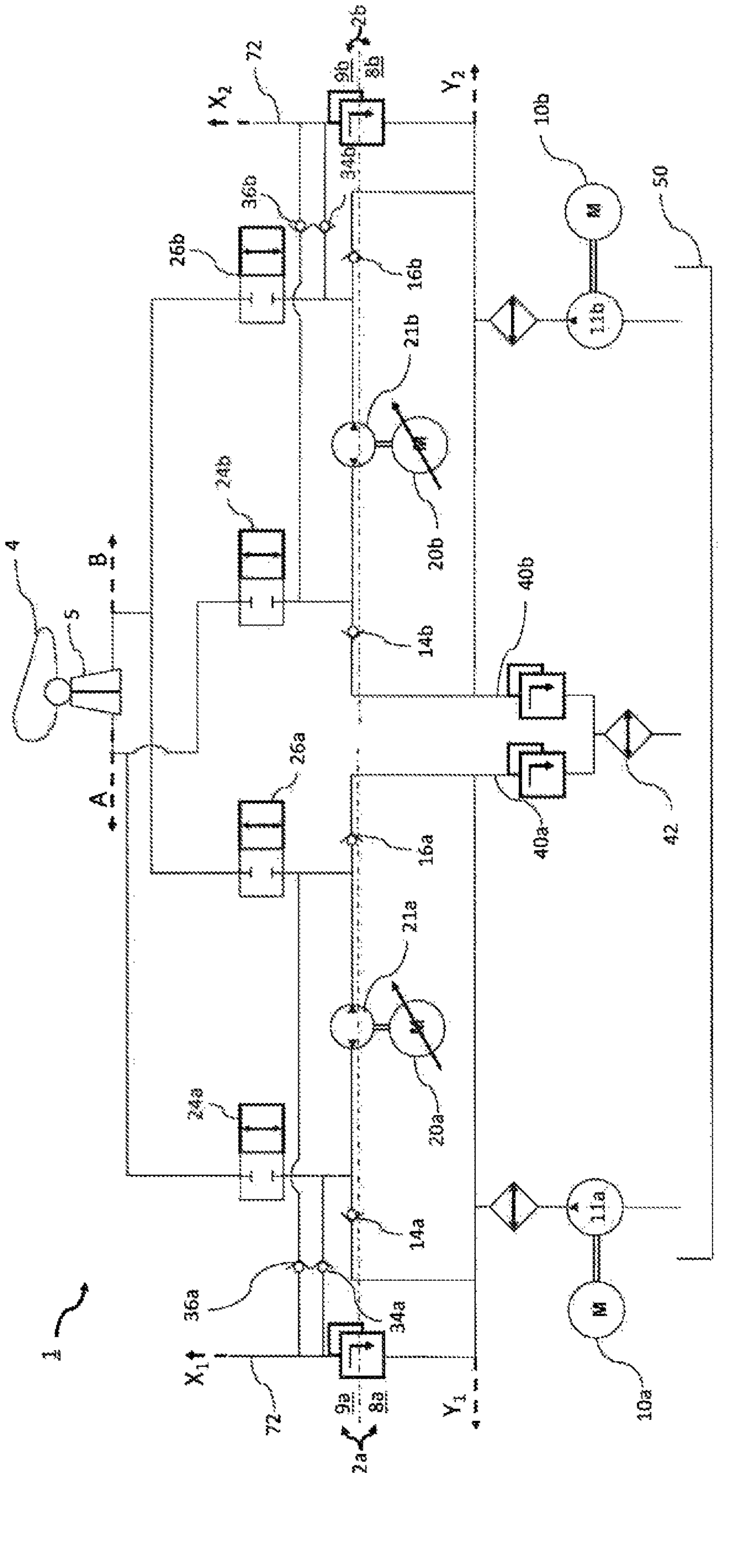
Figure 5:
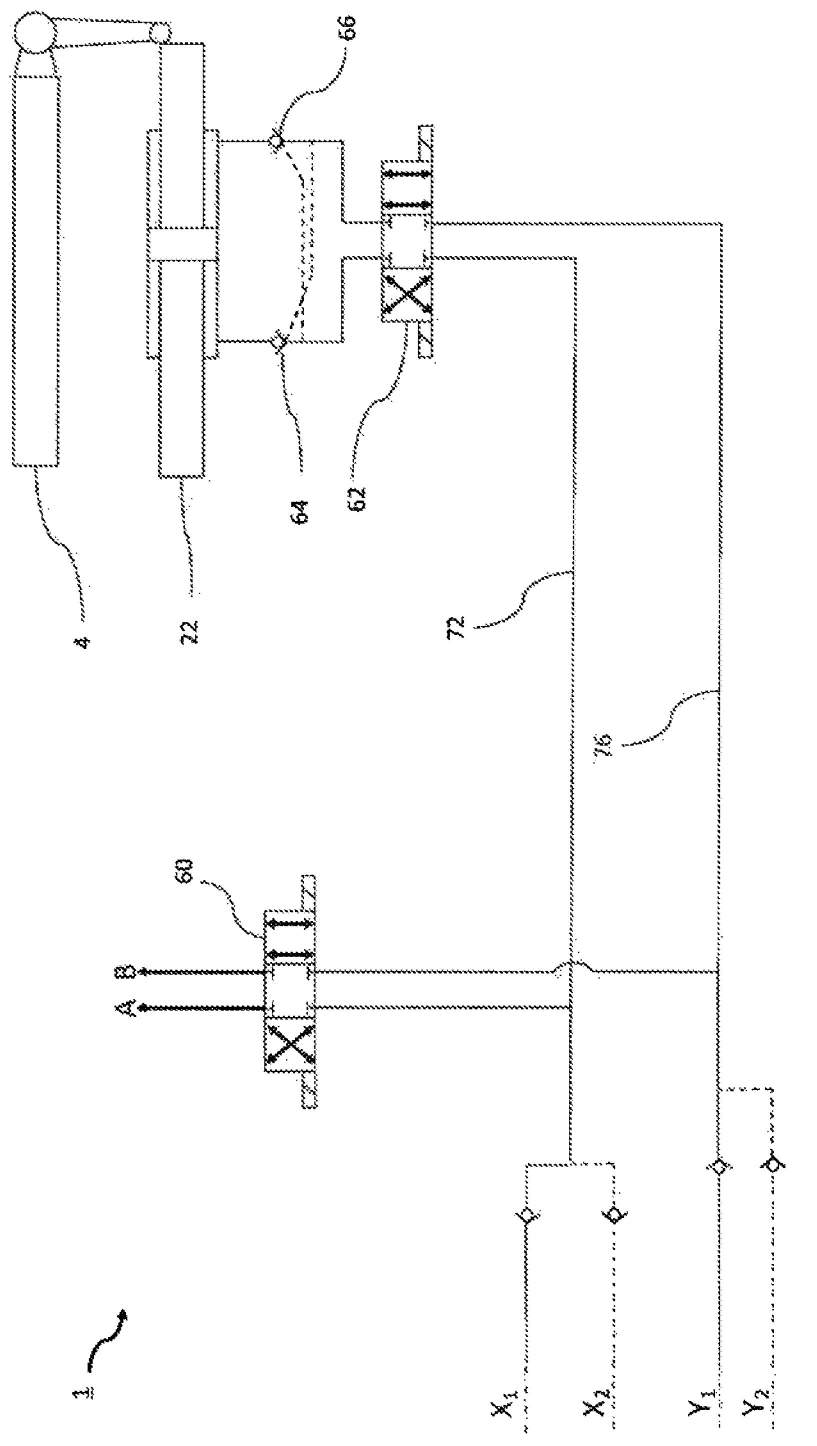

The following are shown:

FIG. 1 an exemplary embodiment according to the invention of a hydraulic system 1 of non-redundant design;

FIG. 2 a section of an exemplary embodiment according to the invention of a hydraulic system of non-redundant design;

FIG. 3 a further section of the exemplary embodiment according to the invention of FIG. 2;

FIG. 4 a section of a further exemplary embodiment according to the invention of a hydraulic system of redundant design;

FIG. 5 a further section of the exemplary embodiment according to the invention of FIG. 4;

FIG. 1 shows an exemplary embodiment according to the invention of the hydraulic system 1.

The hydraulic system 1 has a first hydraulic circuit 2*a*, which in turn comprises a low-pressure circuit 8*a* and a high-pressure circuit 9*a*.

A hydraulic fluid reservoir and in particular a pressure accumulator 52 is hydraulically connected via a flow cooler 42 to the low-pressure circuit.

The low-pressure circuit 8*a* is separated from the high-pressure circuit 9*a* by two anti-cavitation valves, which are shown in this drawing as check valves 14*a*, 16*a*.

Furthermore, a first hydraulic pump 21*a* driven by an electric motor 20*a* and having two connections is integrated in the high-pressure circuit 9*a*. In particular, this electric motor is a variable-speed electric motor 20*a*.

The hydraulic pump 21*a* has two connections, which are hydraulically connected to an actuator 100 via a respective 2/2-way valve 24*a*, 26*a* having a locking position, wherein the actuator 100 can be either a rotary vane motor 5 or a hydraulic cylinder 22.

FIG. 2 shows a section of an exemplary embodiment according to the invention of the hydraulic system 1. FIG. 3 a further section of the exemplary embodiment according to the invention of FIG. 2;

The lines in FIG. 2 are connected to the lines of FIG. 3 at the respective arrows X1 and Y1, along with A and B. The hydraulic system 1 comprises the combination of both sections of FIGS. 2 and 3.

As shown in FIG. 2, the hydraulic system 1 has a first hydraulic circuit 2*a*, which in turn comprises a low-pressure circuit 8*a* and a high-pressure circuit 9*a*.

The low-pressure circuit 8*a* has a second hydraulic pump 11*a*, which is driven by an electric motor 10*a* and hydraulically connected to an open tank 50 and which removes hydraulic fluid therefrom and feeds it into the low-pressure circuit 8*a*. Furthermore, the low-pressure circuit 8*a* has a drain line 40*a*, which is hydraulically connected via a flow cooler 42 to the open tank 50 and through which hydraulic fluid can flow into the tank 50.

The hydraulic fluid in the low-pressure circuit 8*a* is charged via the second hydraulic pump 11*a* to an admission pressure of approximately 20 bar, while the hydraulic fluid in the high-pressure circuit 9*a* can have a pressure of approximately 200 bar or more.

Accordingly, the low-pressure circuit 8*a* is separated from the high-pressure circuit 9*a* by two anti-cavitation valves, which are shown in this drawing as check valves 14*a*, 16*a*.

A first variable-speed electric motor 20*a*, with which the first hydraulic pump 21*a* is operated, is arranged in the high-pressure circuit 9*a*. The first hydraulic pump 21*a* has two connections, which are hydraulically connected to a rotary vane motor 5 via a respective 2/2-way valve 24*a*, 26*a* having a locking position. Thus, the rotary vane motor 5, which serves to adjust an angle of attack of the stabilizer wing 4, is controlled via the 2/2-way valves by the hydraulic pump 21*a*.

The two connections of the first hydraulic pump 21*a* are furthermore each hydraulically connected via a check valve 34*a*, 36*a* to a first line 72 (see FIG. 3).

As can be seen in FIG. 3, the first line 72 is connected via a 4/3-way valve 60 to the rotary vane motor of FIG. 2 (see arrows A and B in FIGS. 2 and 3) and via a 4/3-way valve 62 to a hydraulic cylinder 22, which controls the pivoting in and out of the stabilizer wing 4.

The 4/3-way valves 60 and 62 have a locking center position and are electrically controllable.

The connections of the 4/3-way valve 62 are hydraulically connected with a respective connecting line via a respective check valve 64, 66 to a respective one of the chambers of the hydraulic cylinder 22 and serve for the leak-free blocking of the hydraulic cylinder 22.

As can be seen in FIG. 3, a depressurization line 76 is connected to the two 4/3-way valves so that the hydraulic fluid flowing out of one of the chambers of the hydraulic cylinder 22 or out of the rotary vane motor 5 can flow via the depressurization line 76 into the low-pressure circuit 8*a* of FIG. 2 and, where applicable, through the outlet line 42*a* into the open tank 50 (see arrow Y1).

A check valve 78*a* is arranged in this depressurization line 76 upstream of the connection to the low-pressure circuit 8*a*, in order to regulate the pressure difference.

In comparison to the system of FIG. 2, the hydraulic system 1 of FIG. 4 has a further hydraulic circuit 2*b*, which has a second low-pressure circuit 8*b* and a second high-pressure circuit 9*b*.

The design of the second low-pressure circuit 8*b* is identical to the design of the first low-pressure circuit 8*a*, wherein identical devices are indicated by the same reference signs and a "b".

The outlet line 42*b* is hydraulically connected via the flow cooler 42 to the open tank 50. The low-pressure circuit 8*b* is separated from the high-pressure circuit 9*b* via two check valves 14*b* and 16*b*.

The design of the second high-pressure circuit 9*b* also corresponds to that of the first high-pressure circuit 9*a*, wherein identical devices are indicated by the same reference signs and a "b". The two connections of the third hydraulic pump 21*b* are also fluidically connected via two 2/2-way valves 24*b* and 26*b* to the rotary vane motor 5. Furthermore, the two connections of the third hydraulic pump 21*b* are hydraulically connected via two further check valves 34*b* and 36*b* to the line 72 of FIG. 5 (see arrows X2 and Y2).

The lines in FIG. 4 are connected to the lines of FIG. 5 at the respective arrows X1, Y1, X2, Y2 along with A and B. The hydraulic system 1 comprises the combination of both sections of FIGS. 4 and 5.

FIG. 4, together with FIG. 5, accordingly shows an exemplary embodiment according to the invention of a hydraulic system 1 of redundant design, in which the first and/or the second hydraulic circuit 2*a*, 2*b* control the hydraulic system 1.

In accordance with an exemplary embodiment, the hydraulic system 1 of redundant design of FIGS. 4 and 5 can be operated as follows:

The 2/2-way valves 24*a*, 26*a*, 24*b*, 26*b* are blocked in order to pivot the stabilizer wing out of the hull of the ship. The first hydraulic pump 21*a* and/or the third hydraulic pump 21*b* each control the rotary vane motor 5 and the hydraulic cylinder 22 with the first line 72 and via the 4/3-way valve 60 and the further 4/3-way valve 62. In this case, the 4/3-way valves 60 and 62 are opened so that a pivoting out of the stabilizer wing 4 and the angle of attack of the pivoting-out stabilizer wing 4 can be controlled (see FIG. 5).

When the stabilizer wing 4 is completely pivoted out, the 4/3-way valves 60 and 62 are closed and the angle of attack is controlled by means of the hydraulic pumps 21*a* and/or 21*b* and via the 2/2-way valves 24*a*, 26*a*, 24*b*, 26*b* (see FIG. 4).

In order to pivot the stabilizer wing in, the 2/2-way valves are closed again, and the first hydraulic pump 21*a* and/or the third hydraulic pump 21*b* operate again via the 4/3-way valves 60 and 62.

| List of reference signs | |
| --- | --- |
| 1 Hydraulic system | 2b Second hydraulic circuit |
| 2a First hydraulic circuit | 4 Stabilizer wing |
| 5 Rotary vane motor | 64, 66 Check valves |
| 8a First low-pressure circuit | 72 First line |
| 8b Second low-pressure circuit | 76 Depressurization line |
| 9a First high-pressure circuit | 100 Actuator (rotary vane motor 5 or hydraulic cylinder 22) |
| 9b Second high-pressure circuit | |
| 10a Second electric motor | |
| 10b Fourth electric motor | |
| 11a Second hydraulic pump | |
| 11b Fourth hydraulic pump | |
| 14a, 14b Anti-cavitation valves | |
| 16a, 16b Anti-cavitation valves | |
| 20a First electric motor | |
| 20b Third electric motor | |
| 21a First hydraulic pump | |
| 21b Third hydraulic pump | |
| 22 Hydraulic cylinder | |
| 24a, 24b 2/2-way valves | |
| 26a, 26b 2/2-way valves | |
| 34a, 34b Check valves | |
| 36a, 36b Check valves | |
| 40a First outlet line | |
| 40b Second outlet line | |
| 42 Flow cooler | |
| 50 Tank | |
| 52 Pressure accumulator | |
| 60, 62 4/3-way valves | |

The invention claimed is:

1. Hydraulic system for controlling an angle of attack and/or a pivoting out and in of a stabilizer wing comprising:

a rotary vane motor that changes the angle of attack of the stabilizer wing and/or a hydraulic cylinder for pivoting the stabilizer wing out and in;

a first hydraulic circuit having:

a low-pressure circuit and a high-pressure circuit;

a device for providing an admission pressure of the low-pressure circuit;

two anti-cavitation valves separating the low-pressure circuit from the high-pressure circuit;

a first hydraulic pump driven by an electric motor and having two connections integrated in the high-pressure circuit and hydraulically connected to the rotary vane motor and/or the hydraulic cylinder;

the two connections of the first hydraulic pump each fluidically connected to a first line, wherein the first line is fluidically connected to the rotary vane motor and/or the hydraulic cylinder; and the two connections of the first hydraulic pump each fluidically connected via a check valve to the first line.

2. Hydraulic system according to claim 1, wherein the electric motor is a variable-speed electric motor and the first hydraulic pump is a simple hydraulic pump or the electric motor is a constant-speed electric motor and the first hydraulic pump is a variable-volume hydraulic pump.

3. Hydraulic system according to claim 1, wherein the device for providing an admission pressure is a pressure accumulator having a variable volume.

4. Hydraulic system according to claim 1, wherein the device for providing an admission pressure is a second hydraulic pump connected to a hydraulic fluid reservoir and driven by a second electric motor.

5. Hydraulic system according to claim 1, wherein the first hydraulic pump is hydraulically connected with the first line via a first and a second 4/3-way valve to the rotary vane motor and the hydraulic cylinder in each case.

6. Hydraulic system according to claim 5, wherein the rotary vane motor and the hydraulic cylinder are hydraulically connected with a depressurization line via the first or the second 4/3-way valve to the first low-pressure circuit of the first hydraulic circuit.

7. Hydraulic system according to claim 5, wherein the first and/or second 4/3-way valves are electrically controlled.

8. Hydraulic system according to claim 1, wherein the rotary vane motor is a cylinder or a cylinder arrangement.

9. Hydraulic system according to claim 1, wherein a flow cooler is arranged in the first low-pressure circuit for cooling a hydraulic fluid in the first low-pressure circuit.

10. Hydraulic system according to claim 1, wherein the hydraulic cylinder is a hydraulic cylinder having a first and a second chamber.

11. Hydraulic system according to claim 10, wherein the second 4/3-way valve is hydraulically connected with a first connecting line to the first chamber of the hydraulic cylinder and with a second connecting line to the second chamber of the hydraulic cylinder.

12. Hydraulic system according to claim 11, wherein a check valve in each case for the leak-free blocking of the hydraulic cylinder is arranged in the first and second connecting lines.

13. Hydraulic system according to claim 1 and having a second hydraulic circuit comprising:

a second low-pressure circuit and a second high-pressure circuit;

a second device for providing an admission pressure in the second low-pressure circuit;

a third hydraulic pump driven by a third electric motor and having two connections, wherein the third hydraulic pump is arranged in the second high-pressure circuit and is hydraulically connected to the rotary vane motor and/or the hydraulic cylinder;

two second anti-cavitation valves separating the second low-pressure circuit from the second high-pressure circuit; and the second hydraulic circuit is fluidically connected to the first hydraulic circuit.

14. Hydraulic system according to claim 13, wherein the first low-pressure circuit and the second low-pressure circuit are fluidically connected.

15. Hydraulic system according to claim 13, wherein the third electric motor is a variable-speed electric motor and the third hydraulic pump is a simple hydraulic pump, or the third electric motor is a constant-speed electric motor and the third hydraulic pump is a variable-volume hydraulic pump.

16. Hydraulic system according to claim 13, wherein the second device for providing an admission pressure is a pressure accumulator having a variable volume.

17. Hydraulic system according to claim 13, wherein the second device for providing an admission pressure is a fourth hydraulic pump that is connected to a hydraulic fluid reservoir and driven by a fourth electric motor.

18. Hydraulic system according to claim 13, wherein both connections of the third hydraulic pump are each fluidically connected via a check valve to the first line.

19. Hydraulic system according to claim 13, wherein a second flow cooler is arranged on the second low-pressure circuit.

20. Hydraulic system according to claim 9, wherein a first flow cooler is arranged on the first low-pressure circuit and the first flow cooler and the second flow cooler are one.

21. Hydraulic system according to claim 13, wherein the rotary vane motor and the hydraulic cylinder are hydraulically connected with a depressurization line to the first low-pressure circuit of the first hydraulic circuit and the depressurization line is hydraulically connected to the second low-pressure circuit of the second hydraulic circuit.

22. Method for operating a hydraulic system according to claim 1, wherein the rotary vane motor and/or the hydraulic cylinder are controlled and/or regulated by means of the first hydraulic circuit.

23. Method for operating a hydraulic system according to claim 13, wherein the rotary vane motor and/or the hydraulic cylinder are controlled and/or regulated by means of the second hydraulic circuit.

24. Method for operating a hydraulic system according to claim 13, wherein the rotary vane motor and/or the hydraulic cylinder are controlled and/or regulated by means of the first and/or the second hydraulic circuit.

25. Method for operating a hydraulic system according to claim 24, wherein the hydraulic system is of redundant design by means of the first and second hydraulic circuits.

* * * * *